United States Patent [19]

Takagi

[11] 3,932,356

[45] Jan. 13, 1976

[54] CURABLE POLYESTER RESIN COMPOSITION FOR HYDROPHILIC COATINGS

[75] Inventor: Toru Takagi, Hiratsuka, Japan

[73] Assignee: Kansai Paint Company, Ltd., Hyogo, Japan

[22] Filed: Nov. 30, 1972

[21] Appl. No.: 310,822

[30] Foreign Application Priority Data

Dec. 3, 1971    Japan................................ 46-97176

[52] U.S. Cl.... 260/75 EP; 204/159.16; 204/159.19; 260/77.5 AN; 260/77.5 SS
[51] Int. Cl.² .................. C08G 63/00; C08G 18/62
[58] Field of Search...... 260/77.5 AN, 835, 77.5 SS, 260/75 EP; 204/159.19, 159.16

[56] References Cited
UNITED STATES PATENTS

| | | | |
|---|---|---|---|
| 3,089,863 | 5/1963 | Hicks et al. | 260/75 EP |
| 3,249,653 | 5/1966 | Van Amerongen et al. | 260/75 EP |
| 3,256,226 | 6/1966 | Fekete et al. | 260/75 EP |
| 3,278,636 | 10/1966 | Wynstra | 260/75 EP |
| 3,373,221 | 3/1968 | May | 260/837 |
| 3,485,733 | 12/1969 | D'Alelio | 260/75 EP |
| 3,491,066 | 1/1970 | Petropoulos | 260/75 NK |
| 3,644,569 | 2/1972 | Pietsch et al. | 260/835 |
| 3,655,817 | 4/1972 | Lohse et al. | 260/835 |
| 3,664,861 | 5/1972 | Okamura et al. | 204/159.19 X |
| 3,699,061 | 10/1972 | Cunningham | 260/77.5 AN X |
| 3,700,643 | 10/1972 | Smith | 260/77.5 AN |
| 3,707,526 | 12/1972 | Gannon et al. | 260/835 X |
| 3,749,758 | 7/1973 | Gannon et al. | 260/835 |
| 3,804,921 | 4/1974 | Jamison | 260/75 EP |
| 3,812,063 | 5/1974 | Kimura et al. | 260/75 EP |

OTHER PUBLICATIONS

Hackh's Chemical Dictionary, 3rd Ed., McGraw–Hill, N.Y., (1944), pp. 424–425.

*Primary Examiner*—H. S. Cockeram
*Attorney, Agent, or Firm*—Wigman & Cohen

[57] ABSTRACT

Hydrophilic curable resin composition for preparing hydrophilic resin coating films on articles, which contains, as the resinous component, a polyether ester consisting of 60 to 10 % by weight of non-hydrophilic portion and 40 to 90 % by weight of a hydrophilic polyether portion forming the main chain of the molecule, and said non-hydrophilic portion containing 3 or more equivalents of polymerizable ethylenically unsaturated bond component per mole of said polyether ester based on the average molecular weight, and the coating films formed therefrom, which have water resistance and other excellent properties.

11 Claims, No Drawings

CURABLE POLYESTER RESIN COMPOSITION FOR HYDROPHILIC COATINGS

This invention relates to a hydrophilic curable resin composition for coating. More particularly, the invention relates to the resin composition which can be cured by the irradiation of heat, actinic rays or ionizing radiation, or the addition of hardener, where the obtained coating therefrom is extremely hydrophilic even after the curing, while such coating has excellent water resisting property.

In the ordinary art, a great variety of hydrophilic resin compositions for coatings are well known. For example, there is a composition using ionic hydrophilic resin which contains, as a part of the copolymerizable material, anionic polymerizable monomers such as acrylic acid and 2-sulfoethyl methacrylate or cationic polymerizable monomers such as vinylpyridine and vinylbenzyl quaternary ammonium salt. Further, it is well known that the hydrophilic resin composition can be obtained also by copolymerizing nonionic hydrophilic monomers such as 2-hydroxyethyl methacrylate, polyethylene glycol monomethacrylate and hydroxypropyl methacrylate, as at least one component. Still further, it is known that polyethyleneglycol and the like can be used in order to impart the hydrophilic property to polyester and to form a polyether ester.

However, in the above well known hydrophilic compositions, for example, with regard to the copolymer of hydrophilic monomers, the hydrophilic groups are contained as side chains and cross-linkages are scarcely produced, so that the formed coating film is susceptible to chemical actions and is subject to hydrolysis, thereby showing poor water resistance. Further, the large part of the main chain of the polymer is consisting of ethylenic sequence of carbon atoms, thus the obtained coating is not always satisfactory in flexibility and unsuitable for the use where high flexibility is required. In case of the copolymer of ionic comonomers, unless the salt is formed with any counter ions through neutralization, the hydrophilic property thereof is not so large, thus even though is can be used merely as the water soluble resin composition, it may be difficult to be employed as the hydrophilic coating composition having a good water resistance. Still further, in case of the conventional polyether ester, it is the same as the above that it does not form three dimensional structure, and by the existence of polyether portions at the terminals of the molecule, the polymer is inferior not only in the water resistance but also in other several properties such as friction resistance, weather resistance and solvent resistance, therefore, it can not be used widely for the purpose of giving hydrophilic property.

Further, there are polyether derivatives having cross linking functional groups such as epoxy group at both ends of the molecule, however in these case, the density of cross linkage is low, therefore the superior water resistance can not be expected.

The hydrophilic resin composition for coating of the present invention is novel and quite different from the above-mentioned conventional hydrophilic resin compositions. The hydrophilic resin composition of the present invention comprises polyether ester as the main component, which is modified with ethylenically unsaturated groups, and contains 40 to 90 % by weight of polyether portion in the main chain of the molecule, at the same time, 3 equivalents or more of polymerizable ethylenically unsaturated bond component per 1 mole of the number average molecular weight are contained. That is, the present invention relates to hydrophilic curable resin composition for coating which comprises ethylenically unsaturated and hydrophilic resin component consisting of linear hydrophilic polyester structure and 3 or more equivalents of polymerizable ethylenically unsaturated groups per 1 mole of said ethylenically unsaturated and hydrophilic resin, and said ethylenically unsaturated and hydrophilic resin having number average molecular weight within a range from 2,000 to 10,000 and being formed by either of methods consisting of A. a method being characterized in that linear hydrophilic carboxylated polyester having free carboxyl group pendent from said linear hydrophilic polyester structure is made to react upon ethylenically unsaturated compounds containing oxirane oxygen, said linear hydrophilic carboxylated polyester being formed by polycondensation of dialcohols comprising polyalkyleneglycol expressed by the formula

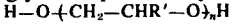

in which R' represents a hydrogen atom or a methyl group and n represents a positive integer from 6 to 50, inclusive, and used in an amount such that 40 to 90 weight percent of said ethylenically unsaturated and hydrophilic resin is consisting of said polyalkylene glycol portion, and benzene polycarboxylic acids selected from the group comprising trimellitic acid, trimellitic anhydride, hemimellitic acid, pyromellitic acid pyromellitic anhydride and benzenepentacarboxylic acid, and said ethylenically unsaturated compounds containing oxirane oxygen being selected from the group comprising glycidyl acrylate, glycidyl methacrylate and allyl glycidyl ether, B. a method being characterized in that linear hydrophilic carboxylated polyester having free carboxyl group at the terminal of linear hydrophilic polyester structure is made to react upon ethylenically unsaturated compounds containing oxirane oxygen, said linear hydrophilic carboxylated polyester being formed by polycondensation of dialcohols comprising polyalkyleneglycol expressed by the formula

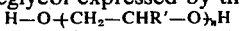

in which R' represents a hydrogen atom or a methyl group and n represents a positive integer from 6 to 50, inclusive, and used in an amount such that 40 to 90 weight percent of said ethylenically unsaturated and hydrophilic resin is consisting of said polyalkyleneglycol portion, and 2 to 4 valent polycarboxylic acid in an amount such that a free carboxyl group or groups are left at the terminal of said linear hydrophilic polyester structure, and said ethylenically unsaturated compounds containing oxirane oxygen being selected from the group comprising glycidyl acrylate, glycidyl methacrylate and allyl glycidyl ether, C. a method being characterized in that linear hydrophilic carboxylated polyester having free carboxyl group pendent from said linear hydrophilic polyester structure is made to react upon ethylenically unsaturated compounds containing oxirane oxygen, said linear hydrophilic carboxylated polyester being formed by polycondensation of dialcohols comprising polyalkyleneglycol and carboxylated dialcohol, said polyalkyleneglycol being expressed by the formula

in which R' represents a hydrogen atom or a methyl group and n represents a positive integer from 6 to 50, inclusive, and used in an amount such that 40 to 90 weight percent of said ethylenically unsaturated and hydrophilic resin is consisting of said polyalkyleneglycol portion, said carboxylated dialcohols being selected from the group comprising α,α-dihydroxymethyl propionic acid and tartaric acid, with divalent carboxylic acids or acid anhydrides and said ethylenically unsaturated compounds containing oxirane oxygen being selected from the group comprising glycidyl acrylate, glycidyl methacrylate and allyl glycidyl ether, and D. a method being characteristic in that linear hydrophilic hydroxylated polyester having free hydroxy group pendent from said linear hydrophilic polyester structure is made to react upon ethylenically unsaturated isocyanate compounds, said linear hydroxylated polyester being formed by polycondensation of 2 to 4 valent polyalcohols comprising polyalkyleneglycol and tri- and/or tetravalent polyalcohol, said polyalkyleneglycol being expressed by the formula

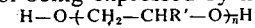

in which R' represents a hydrogen atom or a methyl group and n represents a positive integer from 6 to 50, inclusive, and used in an amount that 40 to 90 weight percent of said ethylenically unsaturated and hydrophilic resin is consisting of said polyalkyleneglycol portion, said tri- and tetravalent polyalcohol being selected from the group comprising glycerol, trimethyolethane, trimethylolpropane and pentaerithritol, with divalent carboxylic acids or acid anhydrides, said ethylenically unsaturated isocyanate compounds being formed by reaction of ethylenically unsaturated monomer containing hydroxyl group selected from the group comprising 2-hydroxyethyl acrylate, 2-hydroxyethyl methacrylate, hydroxypropyl acrylate, hydroxypropyl methacrylate and allyl alcohol upon di- and/or triisocyanate compound selected from the group comprising tolylene diisocyanate, xylylene diisocyanate, hexamethylene diisocyanate, 4,4'-diphenylmethane diisocyanate and triisocyanate compounds expressed by the formula

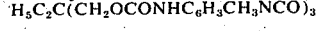
and

in an amount such that 1 equivalent of isocyanate group being left free per 1 mole of said di- or triisocyanate compound. The above-mentioned "polyether portion" denotes that atomic group having a chemical formula $-O+CH_2-CHR-O)_n$ in which R represents a hydrogen atom or a methyl group and n represents a positive integer from 6 to 50. The term "hydrophobic portion" denotes the parts of the molecule of polyether ester other than said polyether portion. The composition of the present invention may be applied on the surfaces of articles, and the cross linkages in the molecular structure are formed by curing the coating films as applied. The obtained film has the excellent hydrophilic property by the existence of a relatively large proportion of said polyether portion, it has also superior water resistance, in addition to that other several properties such as flexibility, friction resistance, weather resistance and solvent resistance of the cured film in the present invention are all excellent. Accordingly, the coating film obtained in the present invention has a wide variety of usages.

The characteristic features of the hydrophilic resin used for the composition of the present invention are that it contains considerably large proportion of the hydrophilic polyether structure in the range of 40 to 90 % by weight, and that the remaining non-hydrophilic portion contains the polymerizable ethylenically unsaturated bond component.

In case the polymer, for example, polyethylene glycol, consists of hydrophilic polyether portion and non-hydrophilic portion forming a water-resistant resin consisting of polymerizable ethylenically unsaturated bond component and the ratio of them is in a suitable range, for example, the polyether component exists in a ratio of 40 to 65 % by weight, the polymer shows the property of polymeric surface active agent, and it is suitable for imparting the hydrophilic property to the surface of the coated articles.

In the present invention, the polymerizable component exists in the non-hydrophilic portion of the polymer in a large degree and a dense three dimensional structure is formed in the resulting film, therefore the content of the polyether component can be increased, for example as high as 90 % by weight, which value is very high as compared with the conventionally known polyether esters. That is, in order to give the surface active property, it is necessary to dispose the hydrophilic portion and the non hydrophilic portion in a certain arrangement and in layered construction in the molecule, even when the ratio of non-hydrophilic portion is very small, such portion can be polymerized, and the connections between the non-hydrophilic portions are formed by covalent bonds which are far stronger than the secondary bonds such as van der Waals' bond, thereby the surface active property can be exhibited. Accordingly, it is possible not only that the ratio of hydrophilic portion can be increased as compared with the prior ones, but also that several properties of the product can be extremely improved by the provision of the network structure of the polymer molecule.

Another characteristic feature of the hydrophilic resin of the present invention is that the hydrophilic polyether portion is contained in the polymer as a part of the main chain thereof. So that, water molecules are adsorbed along the polyether portion and contained in the network structure, while the polymer is not attacked by water because the cross linkage portions of the molecule are hydrophobic, therefore, the hydrophilic resin of the invention is chemically stable and water resistance and alkali resistance are good enough.

The hydrophilic resin composition for coating of the present invention has various excellent characteristics as being mentioned in the above, therefore it can be used for the coatings of various articles used for several purposes. For example, in the portion where the troubles are caused due to the wetting by water, that is in case of which may be dimmed window glass by condensed water vapour or water drops from a room with saturated water vapour, the condensed water can be flowed down as a water film by the application of the coating according to the present invention to the glass or other surfaces, so that such troubles can be prevented. Further, the coatings of the present invention are excellent antistatic agents, therefore if electrically insulating polymer articles in various configurations are coated with using the composition of the present invention, the attraction of light materials such as paper, the inconvenience and discomfort by the electric shock, the dirt by the attracted dust from the surrounding air and the danger of fire by electric discharge to inflammable material can be prevented by the elimination of the static electricity.

In the following, the method for preparing the hydrophilic resin composition for coating of the present invention will be explained.

As disclosed in the above, the hydrophilic resin composition of the invention contains, as the principal component, polyether ester having polymerizable unsaturated bond component, and more particularly, the composition contains the resinous material consisting of 40 to 90 % by weight of polyether which is represented by the following general formula:

$$H-O+CH_2-CHR'-O)_nH$$

in which R' is a hydrogen atom or a methyl group, and $n$ is an integer from 6 to 50, inclusive, and 60 to 10 % by weight of the residual non-hydrophilic portion comprising arylene groups and/or alkylene groups, and if desired, of polymerizable alkenylene group which portion contain 3 equivalents or more of polymerizable ethylenically unsaturated bond component as substituent groups or as side chains or terminal groups per mole of the average molecular weight of the resinous material. If the amount of said polymerizable ethylenically unsaturated bond component is less than 3 equivalents per 1 mole of the number average molecular weight of the resin, the curability of the resin is not sufficient. Further, the compounds in which polymerizable ethylenically unsaturated bond component in which polymerizable ethylenically unsaturated bond component is connected to the main chain by way of urethane bond are included in the above definition.

By arylene group is meant an aromatic hydrocarbon in which two hydrogen atoms thereof are removed and the reactivity with other atoms or atomic groups is given at that position. By alkylene group is meant a group which is obtained by removing two hydrogen atoms from the different carbon atoms of a saturated hydrocarbon being represented by the general formula, $C_nH_{2n+2}$, in which n is a positive integer generally not more than 30. Further, by alkenylene group is meant a group which is obtained by removing two hydrogen atoms from an unsaturated hydrocarbon having a double bond being represented by the general formula, $C_nH_{2n}$, in which n is a positive integer generally 2 or 3.

In addition to the above-mentioned arylene group and alkylene group which may be added with the polymerizable ethylenically unsaturated bond component as the substituent group, the combinations of them such as alkylarylene group and arylalkylene group can be used also for the composition of the present invention.

In order to join the component of polymerizable ethylenically unsaturated bond to the arylene group or alkylene group, it is necessary to employ the raw material having 2 or more, preferably 3 or more of reactive portions. So that in the present invention, for example aromatic polycarboxylic acids or their anhydrides are used as the material for preparing the component having the arylene group. Aromatic polycarboxylic acid can be used for introducing the ethylenically unsaturated bond component to the terminal of the polymer molecule, further it can be used as the intermediate component in the molecule only for the purpose of elongating the length of molecular chain in case the unsaturated bond component is not so much necessary according to the property of the composition to be obtained.

The aromatic polycarboxylic acid those which are useful in the process are phthalic acid anhydride, isophthalic acid, terephthalic acid, naphthalene dicarboxylic acids, 1,2,3-benzene tricarboxylic acid (hemimellitic acid), 1,2,4-benzene tricarboxylic acid (trimellitic acid), trimellitic anhydride, 1,3,5-benzene tricarboxylic acid (trimesic acid), 1,2,4,5-benzene tetracarboxylic acid (pyromellitic acid), pyromellitic anhydride and benzene pentacarboxylic acid. Further, the compounds which are produced by substituting reactive groups such as hydroxyalkyl group and amino group for a part of the carboxyl group of the above compounds can also be used. The raw materials for preparing the compounds having alkylene groups are aliphatic compounds which have 2 or more of functional carboxylic groups, there are for example, adipic acid, succinic acid, succinic anhydride, and their alkyl derivatives, malonic acid, hydroxysuccinic acid, tartaric acid, $\alpha,\alpha$-dihydroxymethyl propionic acid ($\alpha,\alpha$-dimethylol propionic acid) and citric acid. Further, polyhydric alcohols such as ethylene glycol, propylene glycol, neopentyl glycol, trimethylol ethane, trimethylol propane, glycerol and pentaerythritol can be used. As the raw materials for preparing the components having the alkenylene groups, there are $\alpha,\beta$-unsaturated dicarboxylic acids and their anhydrides, for example, maleic acid, maleic anhydride, fumaric acid, itaconic acid, citraconic acid and citraconic anhydride can be used.

The advantage of the employment of the acid anhydrides in place of polycarboxylic acid as the raw materials for the formations of arylene group, alkylene group and alkenylene group comes from the fact that when the ester bonds are formed through the reaction with hydroxyl groups at the terminals of polyether and other alcohol components, it is not necessary to carry out the reaction at a high temperature which is different from the formation of ester bonds by the dehydration condensation, thereby the ratio of selectivity between the formation of ester bonds by the ring opening of the acid anhydrides and those by dehydration of carboxyl groups become large, accordingly, the polymolecularity of the polymer is lowered and the uniform composite can be obtained.

With regard to the method for joining the polymerizable ethylenically unsaturated bond component to the arylene group or alkylene group, it is not necessary to restrict the method to specific one, and as the typical example, the use of unsaturated compound containing oxirane ring structure may be referred. That is, the oxirane ring forms ester bond in the presence of the carboxyl group by the ring opening through heating at a relatively low temperature or ar the room temperature without the fear of viscosity increase or gelation by the thermal polymerization between unsaturated bonds, thereby the introduction of polymerizable substituent group by ester bond can be accomplished. As for the compounds having both of the ethylenically unsaturated bond component and the oxirane ring which can be used for the above purpose, there are, for example, glycidyl acrylate, glycidyl methacrylate, and acrylgrycidyl ether.

As another method for joining the polymerizable ethylenically unsaturated bond component, polyisocyanates can be used. That is, the isocyanate group forms an urethane bond by the reaction with a hydroxyl group at the room temperature or at a relatively low temperature, therefore ethylenically unsaturated compound having isocyanate group can be used for this purpose, in which the ethylenically unsaturated bond can be connected without the fear of thermal polymerization by the unsaturated bond during the reaction. The isocyanate compound containing ethylenically unsaturated component used for this purpose is, for example, an adduct which is prepared by adding an ethylenically unsaturated compound having hydroxyl group to di- or triisocyanate so as to leave 1 equivalent of the isocyanate group unreacted per 1 mole of said isocyanate compound. As for the di- or triisocyanates, for example, there are tolylene diisocyanate, xylylene diisocyanate, hexamethylene diisocyanate, 4,4'-diphenylmethane diisocyanate, Desmodur L (Tradename of Farbenfabriken Bayer A.G., Germany, $H_5C_2C(CH_2OCONHC_6H_3CH_3NCO)_3$ and Desmodur N (The same as the above, $OCN(CH_2)_6N[CONH(CH_2)_6NCO]_2$. As for said ethylenically unsaturated compounds having hydroxyl group, it is generally convenient to use the following compounds, for example, 2-hydroxyethyl methacrylate, 2-hydroxyethyl acrylate, hydroxypropyl methacrylates, hydroxypropyl acrylates and allyl alcohol.

As explained in the above, the resinous material of the invention is prepared from the combination of one or more of materials for arylene group, alkylene group or alkenylene group and compounds containing polymerizable ethyleneically unsaturated bond component, and polyethers such as polyethylene glycol and polypropylene glycol. The applicable weight ratio of the above materials is such that the hydrophilic component of polyether forms 40 to 90 % by weight, preferably 50 to 80 % by weight, of the resin and the other non-hydrophilic component forms 60 to 10 % by weight, preferably 50 to 20 % by weight of the resin. If the ratio of hydrophilic component is less than 40 % by weight or more than 90 % by weight, and that of the non-hydrophilic component is more than 60 % by weight or less than 10 % by weight, the surface activity of the obtained resinous material is not sufficient, thereby the excellent effects as those of the hydrophilic resin composition of the present invention can not be expected.

In general, it is desirable that the obtained resinous material has the number average molecular weight of 2,000 to 10,000 to give a wide usage, however, it does not always follow for special uses.

The molecular structure of the resinous material as obtained from the above raw materials is conceptually represented as follows:

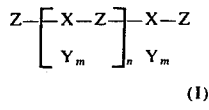

(I)

or

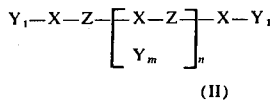

(II)

In the above formula, X is a non-hydrophilic atomic group such as arylene group having branched structure with or without substituent groups, Y is an atomic group having polymerizable ethylenically unsaturated bond and Z is a hydrophilic atomic group consisting of polyester, and each of them is not always a single kind, that is each of them may be a mixture of the above-mentioned materials. Further, the above X can be a polymerizable alkenylene group, and in such case, it is not necessary to join the ethylenically unsaturated group by branched structure. The symbols, l and m are 0 (zero) or integers from 1 to 3, and each of them of generally 1 or 2, further they are not necessarily the same numerals in the same molecule. The symbol n is 0 or positive integer and is generally not more than 20. Further, the sum of l and m in the same molecule is 3 or more. Accordingly, the case in which X is arylene group, alkylene group or alkenylene group having a substituent other than the ethylenically unsaturated bond component is included.

Still further, in case that X is not restricted to arylene group, alkylene group or alkenylene group, and X itself is a high polymer such as polyester and having a branched structure or alkenylene group as a part thereof, the effect of the present invention can be expected equally.

The proportion of said polymerizable ethylenically unsaturated bond component is 3 equivalents or more against 1 mole of the number average molecular weight of the polymer. If the proportion is less than 3 equivalents, the polymerizing property of the hydrophilic resin composition is decreased, so that any special effect on the hydrophilic property can not be obtained as compared with the known hydrophilic compositions. There is no upper limit of said proportion, however, if it is contained in an excessively large amount, the stability of the composition during the production process and storage is liable to decrease, therefore, it is preferably stabilized by adding with a polymerization inhibitor or a stabilizer.

The hydrophilic resin composition of the present invention can be easily prepared from the above-mentioned materials. That is, in the first step, the intermediate material of polyether ester is produced by using polyethyleneglycol or polypropyleneglycol and, if necessary, tri- or polyfunctional aromatic or aliphatic compounds as the source of the branched structure. This reaction can be carried out according to the conventional methods which are well known in the technical field of the invention concerned. That is, polyethers such as polyethyleneglycol may be mixed with the other raw materials and heated at an appropriate temperature.

In the second step, the residual carboxyl group or hydroxyl group in the polyether ester molecule as obtained in the first step is added with the polymerizable ethylenically unsaturated bond component. As being explained in the above, the compounds containing oxirane ring are used as the unsaturated bond components to be connected to carboxyl group, thus the reaction with the carboxyl group can be carried out very easily, therefore high temperature heating is not necessary, and the reaction can be carried out even at room temperature, preferably by heating between 50 to 80°C. Further, when an unsaturated urethane compound is joined with the hydroxyl group, high temperature heating is not necessary too, and such reaction can be carried out at room temperature or preferably at a temperature of 50° to 80°C. Accordingly, there is no fear of thermal polymerization between the ethylenically unsaturated bond components, however, if necessary, the known polymerization inhibitor such as hydroquinone and benzoquinone may be added previously in an amount not exceeding 2g per 1 equivalent of said ethylenically unsaturated bond components. If the amount exceeds 2 g per 1 equivalent of said ethylenically unsaturated bond components, the curing of the composition is obstructed.

In order to reduce the viscosity of the reaction system and to proceed the reaction smoothly and uniformly, each of the above step can be carried out in the presence of solvents which are inactive to the esterification or urethanation, for example, ketones such as methyl ethyl ketone and methyl isobutyl ketone, or the polar solvents of volatile ethers such as dioxane and tetrahydrofuran. In such case, the nonpolar hydrocarbon solvents such as toluene and xylene can be used together as far as they are not obstructive in view of the solubility.

Thus obtained hydrophilic resin composition is applied on the surfaces of several articles as it is, or concentrated, or diluted previously with a miscible solvent. The method of the application of the composition may be selected from the well known ones such as spraying, dipping, flowing, roller coating and so forth. After applying the composition on the surface of article, the volatile solvent is vaporized, and followed with the curing treatment. As the applicable curing methods, there are, for example, heating, irradiation of actinic rays and irradiation of ionizing radiation. In case the composition is cured by heating, it is preferable to add a polymerization initiator into the composition before the coating. As the polymerization initiators, for example, α,α-azobisisobutyronitrile, benzoyl peroxide and cumene hydroperoxide can be used, and the amount of addition thereof may be 0.1 to 6 % by weight against the resinous content of the composition. If the amount is less than 0.1 % by weight against the resinous content, the heat-curability of the resin is lowered, and, if the amount exceeds 6 % by weight, the storage stability of the composition is injured while the heat-curability is not fortified. The most suitable conditions for the heating are in the range of a temperature from 80° to 200°C, and a duration from 0.5 to 30 minutes, and the heating can be carried out in any of air, inert gases, water vapor and vacuum.

In case that the curing is carried out by using actinic rays, the composition may be preferably added with a photosensitizer before the coating. As for such photosensitizers, any of compatible organic ones, for example, those selected from the group comprising tetramethyldiaminobenzophenone, benzoin, N.N-dibutyl-p-nitrosoaniline, benzoin methyl ether, benzoin ethyl ether, α-methylbenzoin, α-phenyl benzoin diacetyl, 1-naphthalene solfonylchloride, ω-bromoacetophenone, eosine and erithrosine, may be used, and as for the light sources, any of the sources which produce the rays of 250 to 600 mu may be used. The appropriate amount of the photosensitizer to be added is 0.1 to 3 % by weight of the resin in the composition. If the amount of the photosensitizer to be added is less than 0.1 % by weight of the resin in the composition, the photo-curability of the resin does not distinguish, and if the amount exceeds 3 % by weight of the resin, the durability of the cured coating film is worse while the photocurability of the resin is almost the same as the composition containing 3 % by weight of photosensitizer. Further, ionizing radiations such as electron beam and gamma rays can be used for the curing of the composition, and the dosage of irradiation thereof may be 0.1 to 20 Mrad.

In the following, the features and advantages of the present invention will be explained by way of preparation examples, application examples and test examples, and further the comparison with the comparative compositions will be shown in order to clarify the superiority of the hydrophilic resin composition of the invention, however the present invention is by no means restricted to these disclosures.

PREPARATION EXAMPLE 1

Into a 3 liter four neck flask attached with a dropping funnel, a thermometer, a reflux condenser and a stirrer, 600 g (1 mole) of polyethylene glycol (number average molecular weight: 600), 174.5 g (0.80 mole) of pyromellitic anhydride and 200 g of methyl ethyl ketone were fed, the temperature was raised with stirring, and after about 40 minutes the mixture was boiled. The reaction had been partially proceeded when the temperature of the reaction system became the boiling point and at that time, the reaction system was transparent, then the reaction was further proceeded at about 100°C for 5 hours with boiling and reflux, thus the acid value as calculated on nonvolatiles became about 118.

Thereafter, the reaction system was cooled to about 65°C, and 228 g (1.6 moles) of glycidyl methacrylate and 1 g of hydroquinone were added, further about 450 g of tetrahydrofuran was slowly added drop by drop with temperature regulation, thereby the reaction was continued at about 70° to 75°C with boiling and reflux. After 4 hours continuation of this heating, the acid value of the resinous component became about 3.5.

This resin solution was cooled as it is to obtain the hydrophilic resin composition for coating. The resin content of this solution was about 60 %.

The ratio of polyether portion in this hydrophilic resin was about 58 % by weight.

PREPARATION EXAMPLE 2

A reaction vessel as used in the foregoing Preparation Example 1 except that an inert gas feeding pipe being attached and a separating funnel being connected to the reflux condenser, was used. Said vessel was fed with 1000 g (1 mole) of polyethylene glycol (number average molecular weight: 1000), 196 g (2 moles) of maleic anhydride and 134 g (1 mole) of α,α-dihydroxymethyl propionic acid. Further, 65 g of toluene as a reflux solvent was added to the above mixture. This reaction system was heated at a temperature of 170° to 200°C in the presence of nitrogen gas flow, while the water produced from the condensation was removed. When the acid value of nonvolatiles became 51 after about 6 hours' reaction, the heating was stopped and cooled to 70°C. Then, the reaction system was added with 142 g (1 mole) of glycidyl methacrylate, 1 g of hydroquinone and 200 g of acetone and the temperature was kept at 65° to 75°C for 4 hours to proceed the addition of said glycidyl methacrylate.

The content of non-volatile matter of the obtained hydrophilic resin composition was about 85 %, and the acid value of non-volatile matter was 7.3.

The ratio of polyether portion in the hydrophilic resin of this Example was about 68 % by weight.

PREPARATION EXAMPLE 3

The same reaction vessel as used in Preparation Example 2 was fed with 720 g (1.8 moles) of polyethylene glycol (number average molecular weight: 400), 118 g (1.2 moles) of maleic anhydride and 60 g of toluene as a reflux solvent, and dehydration condensation was carried out in the presence of nitrogen gas flow at a temperature of 170° to 200°C for about 6 hours, thereby polyether ester of 1.0 in the acid value was obtained.

This reaction mixture was cooled to 80°C and was added with 115 g (0.6 mole) of trimellitic anhydride, 160 g (0.6 mole) of dodecylsuccinic anhydride (made by Teikoku Kako Kabushiki Kaisha, Japan; trade name: DSA), and 240 g of methyl ethyl ketone, and the above acid anyhydrides were joined with said polyether ester by the reaction at 90° to 100°C for 5 hours.

Thereafter as the third reaction step, the above reaction product was added with 230 g (1.8 moles) of glycidyl acrylate and 1.8 g of hydroquinone, and caused to react at 60° to 70°C for 4 hours, thereby the unsaturated bond was added.

By the above steps, the hydrophilic resin composition of about 82 % in the resin content and 3.2 in the acid value of resinous component was obtained. The ratio of polyether portion of this hydrophilic resin composition was about 55 % by weight.

PREPARATION EXAMPLE 4

The same reaction vessel as used in Preparation Example 2 was fed with 1,200 g (0.6 mole) of polypropylene glycol (number average molecular weight: 2,000), 118 g (1.2 moles) of maleic anhydride and 80 g of toluene, and heated at 90° to 100°C for 4 hours, thereby the esterification by ring opening of acid anhydride group was carried out.

Then 69 g (0.75 mole) of dynamite grade glycerol was added and the temperature was raised, thereby the dehydration condensation was carried out in the presence of nitrogen gas flow at 170° to 200°C for 6 hours to obtain a solution of resinous material.

Further as the third step, the above reaction mixture was cooled to 60° to 70°C and was added with 240 g of dioxane, and 183 g of unsaturated urethane adduct which was prepared by the undermentioned method was then added little by little to the above mixture. After this addition, the mixture was kept at the same temperature for 5 hours to obtain the unsaturated hydrophilic resin, thereby the composition of 82 % in the resin content was obtained. The ratio of polyether portion in this modified hydrophilic resin was about 72 %.

PREPARATION OF UNSATURATED URETHANE ADDUCT

A 1 liter four neck flask with a reflux condenser, a thermometer, a dropping funnel and a stirrer was fed with 344 g (2 moles) of tolylene diisocyanate and heated at about 60°C by a water bath, while 282 g (2.2 moles) of 2-hydroxyethyl methacrylate containing 2 g of benzoquinone was dropped slowly for about 1.5 hours from the dropping funnel. During the above reaction, the temperature was always regulated at 60° to 70°C, and after the above dropping, the reaction was completed by keeping the reaction mixture at the same temperature for further 3 hours, thereby a solid unsaturated urethane adduct was obtained.

PREPARATION EXAMPLE 5

Into a 2 liter four neck flask with a condenser, a thermometer, an inert gas inlet pipe and a stirrer, 500 g (0.5 mole) of polyethylene glycol (number average molecular weight: 1000), 194 g (1 mole) of dimethyl terephthalate and a small amount of xylene were introduced, and condensation with methanol splitting was carried out at 230° to 240°C for about 5 hours under nitrogen gas atmosphere. Then, 81 g (0.6 mole) of 1,1,1-trimethylolpropane was added and similar condensation reaction was carried out to obtain resinous material.

Then this resinous material was cooled, and 250 g of dioxane and 250 g of methyl ethyl ketone were added to dissolve the resinous material, then 244 g of the unsaturated urethane adduct as obtained in Preparation Example 4 was caused to react at 60° to 70°C, thereby the modification of the resinous material by unsaturation was carried out.

By the above process, an unsaturated hydrophilic resin composition of about 65 % in the non-volatile matter content was obtained.

The ratio of polyether portion of the hydrophilic resin of this Example was about 51 % by weight.

PREPARATION EXAMPLE 6

The reaction vessel as used in Preparation Example 1 was fed with 1,500 g (1 mole) of polyethylene glycol (number average molecular weight: 1500), 175 g (0.8 mole) of pyromellitic anhydride and 300 g of dioxane, and heated at 90° to 100°C for 5 hours. Thereby polyether ester was prepared by the ring opening of the acid anhydride.

Then the reaction mixture was diluted with 300 g of methyl ethyl ketone, and further added with 228 g (1.6 moles) of glycidyl methacrylate and 2 g of hydroquinone, then heated at 70° to 80°C for 5 hours to cause the addition reaction, thereby the hydrophilic resin composition was obtained.

The ratio of polyether portion in this hydrophilic resin was about 78 % by weight.

PREPARATION EXAMPLE 7

The reaction vessel as used in Preparation Example 1 was fed with 750 g (1.5 moles) of polyethylene glycol (number average molecular weight: 500), 218 g (1 mole) of pyromellitic anhydride and 300 g of dioxane, and heated at 90° to 100°C for 5 hours to obtain the polyether ester.

Then this reaction mixture was added with 456 g (4 moles) of acrylglycidyl ether and 2 g of hydroquinone, and was caused to react at 80° to 90°C for 4 hours to obtain the hydrophilic resin composition.

The ratio of polyether portion in this hydrophilic resin was about 45 % by weight.

COMPARATIVE EXAMPLE 1

A 2 liter four neck flask with an inert gas inlet pipe, a reflux condenser, a thermometer and a stirrer was fed with 480 g of 2-hydroxyethyl methacrylate, 20 g of ethylene glycol dimethacrylate, 400 g of ethyl alcohol, 200 g of ethylene glycol monoethyl ether (cellosolve) and 5 g of α,α-azobisisobutyronitrile, then the mixture was heated to polymerize at 78° to 79°C for 5 hours in the presence of nitrogen gas flow. After the polymerization, the reaction mixture was diluted and cooled with 1800 g of water, 1,400 g of ethyl alcohol and 700 g of Cellosolve to obtain Comparative Composition 1.

COMPARATIVE EXAMPLE 2

The same reaction vessel as used in Comparative Example 1 except that the reflux condenser being provided with a separating funnel, was fed with 300 g (0.5 mole) of polyethylene glycol (number average molecular weight: 600), 296 g (2.0 moles) of phthalic anhydride, 208 g (2.0 moles) of neopentyl glycol and 30 g of xylene as the reflux solvent, and dehydration condensation was carried out at 220° to 230°C for about 6 hours in the presence of nitrogen gas flow. Thereby, polyether ester of 0.8 in the acid value was obtained. Then, the reaction system was cooled to about 90°C and dissolved by adding 300 g of methyl isobutyl ketone. And further, 192 g (1.0 mole) of trimellitic anhydride was added and heated at 90° to 100°C for about 3 hours. Thereafter, the reaction mixture was further added with 142 g (1 mole) of glycidyl methacrylate and 0.6 g of hydroquinone and was caused to react at 70° to 80°C for additional 3 hours to obtain Comparative Composition 2.

The ratio of polyether portion of the resin of this Composition was about 26 % by weight.

APPLICATION EXAMPLE 1

The hydrophilic resin compositions as obtained in Preparation Examples 1, 2, 3 and 6 were added with $\alpha,\alpha$-azobisisobutyronitrile in the amount of 3 % by weight against the resinous solid contents of the compositions, respectively. Then the viscosities of the compositions were adjusted by additions of methyl ethyl ketone so as to facilitate the coating operation, and each of thus prepared composition was applied on one side surface of a mild steel plate of 0.8 mm in thickness so as to form a coating of 5 to 8 microns in dried thickness. After the evaporation of the solvent, each of the test plates were heated at 150°C for 10 minutes, thereby the applied films were cured.

Each test plate was held above boiling water with the coated surface below and with 45° inclination, thus water vapor was allowed to condense on the coated surface, however, the condensed water did not form water drops and the coated surface was covered with a smooth water layer. A similar test on Comparative Composition 2 was also carried out, however in this case, such effect was not observed.

Further, each of the test plates was immersed into water at 20°C for 48 hours and 0.5 % aqueous caustic soda for 24 hours, however, any change was not found with regard to the coatings obtained from the composition of the present invention. The coating film which was obtained from said Comparative Composition 2 was partially dissolved by the immersion into the 0.5 % aqueous caustic soda.

APPLICATION EXAMPLE 2

By using the hydrophilic resin composition as obtained in Preparation Example 7 and benzoyl peroxide, a similar test plate was prepared and similar tests were carried out. The results thereof were as good as those of the above Application Example 1.

APPLICATION EXAMPLE 3

The hydrophilic resin composition as obtained in Preparation Example 4 was added with benzoin ethyl ether in the amount of 2 % by weight against the resinous solid content of the composition, then the viscosity of the composition was adjusted by methyl ethyl ketone to facilitate the use. Thereafter, thus obtained composition was applied on one side surface of a polished glass plate of 2 mm in thickness so as to form a dried coating film of about 20 microns thickness. After the evaporation of the solvent, the applied film was cured by irradiation of ultraviolet rays for 8 minutes from a chemical lamp (made by Tokyo Shibaura Electric Co., Ltd., Japan; Model: SL-20BL) which is placed at 20 cm distance.

With regard to this glass test plate, the similar tests as those in Application Examples 1 and 2 were carried out, and as the result, it was found that any dimness with water vapour was not caused.

APPLICATION EXAMPLE 4

The hydrophilic resin composition as obtained in Preparation Example 5 was applied on one side surface of 20 cm × 30 cm ABS (acrylonitrile-butadiene-styrene) resin plate of 3 mm in thickness so as to form a dried layer of about 10 microns thickness, and the formed layer was applied with about 8 Mrad dose of 300 KeV electron beam to be cured.

In a room of 20°C and 60% in relative humidity, this test plate was rubbed strongly with dried paper and fabric of polyester fiber, however any electric charge was not observed.

While, an ABS test plate of the same size without said treatment was subjected to the same test, in which considerable electric charge was observed.

TEST EXAMPLE

A part of the hydrophilic resin composition obtained in the above Preparation Examples were subjected to water absorption tests according to the following manner. Further, Comparative Compositions 1 and 2 were also tested in order to compare their results, which are shown in the following Table. As will be understood from the Table, the cured coating films obtained from the compositions of the present invention have excellent water resistance as compared with the ordinary ones.

METHOD OF WATER ABSORPTION TEST

The hydrophilic resin composition of each Example as indicated in the following Table with or without curing agent, was added with methyl ethyl ketone, thereby the viscosity of the composition was adjusted to facilitate the coating operation. Said composition was then applied to one side of transparent polyester film on the market of 100 microns in thickness so as to form a coating layer of 17 to 23 microns in dried thickness by using bar coater. After evaporating the solvent at the room temperature, each coating layer was cured through the method and condition as indicated in the following Table. While, the test piece was weighed before and after the coating.

Each test piece was then immersed into distilled water at 60°C for 30 minutes, thereafter the test piece was taken out from water and the water on the surface was wiped off. And immediately thereafter, the test piece was weighed to obtain the quantity of water which is absorbed in the coating film. The rate of absorption as indicated in the Table was calculated from the following equation.

$$\text{Ratio of Absorption (\%)} = \frac{(\text{Weight Increase by Immersion}) \times 100}{(\text{Weight of Piece after Coating}) - (\text{Weight of Piece before Coating})}$$

With regard to the test pieces which are applied with the hydrophilic resin composition of the present invention, the adhesion between the polyester film and the coating film is very excellent, the changes of appearance such as blistering and peeling after the immersion were not observed, and any crack and peeling were not caused even when the coated film was folded.

| Preparation Example No. | Results of Water Resistance Tests Method of Curing | Ratio of water Absorption |
| --- | --- | --- |
| 1 | Added 3 % AIBN[(1)], heated in air at 150°C, 10 min. | 38 % |
| 1 | Added 3 % AIBN, heated in $N_2$ at 100°C, 10 min. | 12 % |
| 2 | Added 2 % AIBN, heated in air 53 % | |
| 2 | Added 2 % AIBN, heated in $N_2$ at 80°C, 10 min. | 29 % |
| 4 | The same as Application Example 3 | 30 % |
| 5 | The same as Application Example 4 | 18 % |
| 7 | Added 3 % BPO[(2)], heated in air at 120°C, 10 min. | 22 % |
| 7 | Added 3 % BPO, heated in steam at 100°C, 10 min. | 46 % |
| Comparative Composition 1 | Added 0.5 % ammonium bichromate, heated in air at 150°C, 10 min. | —[(3)] |
| Comparative Composition 1 | Added 2 % ammonium bichromate heated in air at 150°C, 10 min.[(4)] | 95 % |
| Comparative Composition 2 | Added 3 % AIBN, heated in air at 150°C, 10 min. | 78 % |

Notes:
[(1)]α,α-azobisisobutyronitrile, the addition amount of which is represented by percent by weight against the resinous solid content.
[(2)]Benzoyl peroxide, the addition amount of which is the same as the above[(1)].
[(3)]Was impossible to measure because the surface of the coating film was dissolved.
[(4)]The coating film was brittle and was liable to peel off. After the immersion, the coating film peeled off partially.

As will be understood from the disclosures of the above, the coating film which is obtained from the composition of the present invention is excellent.

It should be emphasized, however, that the specific examples described and shown herein are intended as merely illustrative and in no way restrictive of the invention.

What is claimed is:

1. A resinous coating composition curable to form a water-resistant hydrophilic coating comprising an ethylenically unsaturated resinous component having an average molecular weight in the range from 2,000 to 10,000, said resinous component being the reaction product of 3 or more moles of an ethylenically unsaturated compound containing an oxirane oxygen selected from the group consisting of glycidyl acrylate, glycidyl methacrylate and allyl glycidyl ether with one mole of a condensation product of a polycarboxylic acid of functionality 2 to 5 or acid anhydride and a polyalkylene glycol represented by the following general formula:

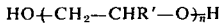
$$HO + CH_2 - CHR' - O)_n H$$

in which R' represents hydrogen or a methyl group and n is an integer from 6 to 50 inclusive, the proportion of polyacid and polyalkylene glycol being such that the condensation product is terminated by a carboxylic acid group, the proportion of condensation product in the reaction product ranging from 40 to 90% by weight of the reaction product.

2. Hydrophilic curable resin composition for coating as claimed in claim 1, which also contains a polymerization inhibitor comprising hydroquinone and benzoquinone is added in an amount not exceeding 2 g per 1 equivalent of said polymerizable ethylenically unsaturated groups.

3. Hydrophilic curable resin composition for coating as claimed in claim 1, which also contains a polymerization initiator comprising α,α-azobisisobutyronitrile, benzoyl peroxide and cumene hydroperoxide is added in an amount from 0.1 to 6 % by weight against said ethylenically unsaturated and hydrophilic resin component in said hydrophilic curable resin composition.

4. Hydrophilic curable resin composition for coating as claimed in claim 1, which also contains a photosensitizer comprising tetramethyldiaminobenzophenone, benzoin, N,N-dibutyl-p-nitrosoaniline, benzoin methyl ether, benzoin ethylether, α-methylbenzoin, α-phenylbenzoin, diacetyl, 1-naphthalene sulfonylchloride, w-bromoacetophenone, eosine and erithrosine is added in an amount from 0.1 to 3 % by weight against said ethylenically unsaturated and hydrophilic resin component in said hydrophilic curable resin composition.

5. Hydrophilic curable resin composition for coating as claimed in claim 1, which also contains a polymerization inhibitor comprising hydroquinone and benzoquinone and polymerization initiator comprising α,α-azobisisobutyronitrile, benzoyl peroxide and cumene hydroperoxide are added in an amount not exceeding 2 g per 1 equivalent of said polymerizable ethylenically unsaturated groups and from 0.1 to 6 % by weight against said ethylenically unsaturated and hydrophilic resin component in said hydrophilic curable resin composition, respectively.

6. Hydrophilic curable resin composition for coating as claimed in claim 1, which also contains a polymerization inhibitor comprising hydroquinone and benzoquinone and photosensitizer comprising tetramethyldiaminobenzophenone, benzoin, N,N-dibutyl-p-nitrosoaniline, benzoin methyl ether, benzoin ethyl ether, α-methylbenzoin, α-phenylbenzoin, diacetyl, 1-naphthalene sulfonylchloride, w-bromoacetophenone, eosine and erithrosine are added in an amount not exceeding 2 g per 1 equivalent of said polymerizable ethylenically unsaturated groups and from 0.1 to 3 % by weight against said ethylenically unsaturated and hydrophilic resin component in said hydrophilic curable resin composition, respectively.

7. A resinous coating composition as set forth in claim 1 in which the condensation product is obtained using a polyhydric alcohol selected from the group consisting of ethylene glycol, propylene glycol, trimethyol ethane, trimethyol propane, glycerol and pentaerthitol, or a carboxylated dialcohol taken from the group consisting of α,α-dihydroxy methylpropionic acid.

8. A resinous coating composition curable to form a water-resistant hydrophilic coating comprising an ethylenically unsaturated resinous component having an average molecular weight within the range of 2,000 to 10,000, said resinous component is the reaction product of 3 or more moles of an ethylenically unsaturated compound containing oxirane oxygen selected from the group consisting of glycidyl acrylate, glycidyl methacrylate and allyl glycidyl ether with one mole of a condensation product of a polycarboxylic acid selected from the group consisting of adipic acid, succinic acid, succinic anhydride, alkyl derivatives of succinic acid, malonic acid, phthalic anhydride, isophthalic acid, terephthalic acid, naphthalene dicarboxylic acid, 1,2,3 benzene tricarboxylic acid, 1,2,4 benzene tricarboxylic acid, 1,3,5 benzene tricarboxylic acid, 1,2,4,5 benzene tetracarboxylic acid, pyromellitic anhydride, benzene pentacarboxylic acid, maleic acid, maleic anhydride, fumaric acid, itaconic acid, citric acid, citraconic acid, tartaric acid, $\alpha,\alpha$-dihydroxymethyl propionic acid; and a polyalkylene glycol which is represented by the formula:

$$HO \text{\textemdash} (CH_2 \text{\textemdash} CHR' \text{\textemdash} O)_n H$$

in which $R'$ represents hydrogen or a methyl group and $n$ is an integer from 6 to 50 inclusive, the proportion of polycarboxylic acid and polyalkylene glycol being such that the condensation product is terminated by a free carboxyl group or groups, and the resinous component molecule contains from 40 to 90% by weight derived from the condensation product of the polycarboxylic acid and the polyalkylene glycol.

9. A resinous coating composition curable to form a water-resistant hydrophilic coating comprising an ethylenically unsaturated resinous component having an average molecular weight ranging from 2,000 to 10,000 and formed by reacting 3 or more moles of an ethylenically unsaturated compound containing oxirane oxygen selected from the group consisting of glycidyl acrylate, glycidyl methacrylate and allyl glycidyl ether and one mole of a condensation product having 3 or more equivalents of carboxylic groups based upon the average molecular weight of said condensation product, said condensation product being formed using a polycarboxylic acid selected from the group consisting of trimellitic acid, trimellitic anhydride, hemimellitic acid, trimesic acid, pyromellitic anhydride and benzene pentacarboxylic acid and a polyalkylene glycol of the general formula;

$$HO \text{\textemdash} (CH_2 \text{\textemdash} CHR' \text{\textemdash} O)_n H$$

in which $R'$ represents hydrogen or a methyl group and $n$ represents a positive integer from 6 to 50 inclusive; said condensation product comprising from 40 to 90% by weight of the resinous product.

10. A resinous coating composition curable to form a hydrophilic coating comprising an ethylenically unsaturated resinous component having an average molecular weight in the range from 2,000 to 10,000, and being the reaction product of three or more moles of an ethylenically unsaturated compound containing an oxirane oxygen selected from the group consisting of glycidyl acrylate, glycidyl methacrylate and allyl glycidyl ether with one mole of a condensation product of a dibasic carboxylic acid or acid anhydride with a dihydric alcohol comprising a polyalkylene glycol expressed by the formula:

$$HO \text{\textemdash} (CH_2 \text{\textemdash} CHR' \text{\textemdash} O)_n H$$

in which $R'$ represents hydrogen or a methyl group and $n$ represents a positive integer from 6 to 50 inclusive; and a carboxylated dialcohol selected from the group consisting of an $\alpha,\alpha$-dihydroxymethyl propionic acid and tartaric acid; said condensation product comprising from 40 to 90% by weight of said resinous component.

11. A resinous coating composition curable to form a hydrophilic coating which comprises an ethylenically unsaturated resinous component having an average molecular weight from 2,000 to 10,000, said resinous component is the reaction product of 3 or more moles of an ethylenically unsaturated compound selected from the group consisting of glycidyl acrylate, glycidyl methacrylate and allyl glycidyl ether, with one mole of a condensation product of at least one polycarboxylic acid or acid anhydride of functionality 2 to 5 with a polyalcohol comprising a polyalkylene glycol having the general formula:

$$HO \text{\textemdash} (CH_2 \text{\textemdash} CHR' \text{\textemdash} O)_n H$$

in which $R'$ represents hydrogen or methyl group and $n$ is a positive integer from 6 to 50 inclusive, said acid and polyalcohol being condensed in an amount such that the condensation product contains 3 or more carboxyl groups, said glycidyl compound being reacted with the condensation product in an amount such that the condensation product is from 40 to 90% by weight of the resinous component.

* * * * *